(12) United States Patent
Baldemair et al.

(10) Patent No.: US 9,179,478 B2
(45) Date of Patent: *Nov. 3, 2015

(54) METHOD AND ARRANGEMENT IN A TELECOMMUNICATION SYSTEM

(71) Applicant: Unwired Planet, LLC, Reno, NV (US)

(72) Inventors: Robert Baldemair, Solna (SE); Jacobus Cornelis Haartsen, Hardenberg (NL); Stefan Parkvall, Stockholm (SE); Gunnar Peters, Stockholm (SE); Henrik Sahlin, Mölnlycke (SE)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,237

(22) Filed: Feb. 12, 2013

(65) Prior Publication Data

US 2014/0105124 A1   Apr. 17, 2014

Related U.S. Application Data

(63) Continuation of application No. 12/162,522, filed as application No. PCT/SE2007/050037 on Jan. 24, 2007, now Pat. No. 8,391,131.

(30) Foreign Application Priority Data

Feb. 3, 2006   (SE) ...................................... 0600255

(51) Int. Cl.
*H04W 74/08*   (2009.01)
*H04J 13/00*   (2011.01)
*H04L 27/26*   (2006.01)

(52) U.S. Cl.
CPC ....... *H04W 74/0833* (2013.01); *H04J 13/0003* (2013.01); *H04L 27/2607* (2013.01); *H04L 27/2613* (2013.01); *H04W 74/08* (2013.01)

(58) Field of Classification Search
None
See application file for complete search history.

(56) References Cited

U.S. PATENT DOCUMENTS 7,561,511 B1   7/2009   Kumar et al.
2002/0181509 A1   12/2002   Mody et al.
(Continued)

FOREIGN PATENT DOCUMENTS

GB   2 434 064 A   7/2007
WO   2004077684 A2   9/2004
WO   2005088853 A1   9/2005

OTHER PUBLICATIONS

International Preliminary Examination Report for PCT/SE2007/050037 dated Jun. 11, 2008.
(Continued)

*Primary Examiner* — Chirag Shah
*Assistant Examiner* — Suk Jin Kang
(74) *Attorney, Agent, or Firm* — Nixon & Vanderhye P.C.

(57) ABSTRACT

There is provided a method of operating a communication system, the communication system comprising a user equipment and a receiver, the method in the system comprising generating a random access transmission in a user equipment and transmitting the random access transmission to the receiver in the communication system, the random access transmission including a preamble; receiving the random access transmission from the user equipment at the receiver; processing the random access transmission in the frequency domain to detect the preamble. In preferred embodiments of the invention, the preamble has a cyclic prefix, or is preceded by a plurality of zero-valued symbols.

16 Claims, 7 Drawing Sheets

(56) References Cited

U.S. PATENT DOCUMENTS

| | | |
|---|---|---|
| 2004/0082356 A1 | 4/2004 | Walton et al. |
| 2004/0264431 A1 | 12/2004 | Rhodes |
| 2005/0013238 A1 | 1/2005 | Hansen |
| 2005/0026621 A1 | 2/2005 | Febvre et al. |
| 2005/0031018 A1 | 2/2005 | Papadimitriou et al. |
| 2005/0078598 A1 | 4/2005 | Batra et al. |
| 2005/0219998 A1 | 10/2005 | Kumar et al. |
| 2005/0286465 A1 | 12/2005 | Zhuang |
| 2006/0087961 A1 | 4/2006 | Chang et al. |
| 2006/0176966 A1 | 8/2006 | Stewart et al. |
| 2006/0239370 A1 | 10/2006 | Mody et al. |
| 2007/0171993 A1 | 7/2007 | Lai et al. |
| 2007/0230600 A1 | 10/2007 | Bertrand et al. |
| 2008/0043671 A1 | 2/2008 | Moon et al. |
| 2008/0080461 A1 | 4/2008 | Lee |
| 2008/0101306 A1 | 5/2008 | Bertrand et al. |
| 2008/0192678 A1 | 8/2008 | Bertrand et al. |
| 2008/0273611 A1 | 11/2008 | Ghosh |
| 2008/0316961 A1 | 12/2008 | Bertrand et al. |
| 2009/0040918 A1 | 2/2009 | Jiang et al. |
| 2009/0046629 A1 | 2/2009 | Jiang et al. |
| 2009/0067540 A1 | 3/2009 | Lee et al. |
| 2009/0109919 A1 | 4/2009 | Bertrand et al. |
| 2010/0080307 A1 | 4/2010 | Lee et al. |

OTHER PUBLICATIONS

International Search Report for PCT/SE2007/050037, mailing date Jul. 25, 2007.
Ericsson, "E-UTRA Random Access," 3 GPP TSG-RAN WG1 Meeting #3, Seoul Korea, Nov. 7-11, 2005, R1-051445.
Zakharov, Y.V. et al., "Detection of preamble of random access burst in W-CDMA system" Personal, Indoor and Mobile Radio Communications, 2000, PIMRC 2000, The 11th IEEE International Symposium, vol. 1, pp. 82-86, 2000.
Falconer, D. et al., "Frequency Domain Equalizer for Single-Carrier Broadband Wireless Systems," Communications Magazine, IEEE, vol. 40, No. 4, pp. 58-66, Apr. 2002.
Coon, J., et al., "Near Optimal Design in Single-Carrier Block Transmission Systems," Signal Processing and Its Applications, 2005, Proceedings of the Eighth International Symposium, vol. 1, pp. 303-306, Aug. 28-31, 2005.
EPO Communication pursuant to Article 94(3) EPC, issued in corresponding EPO Application No. 07 709 430.8, dated Oct. 31, 2013 (4 pgs).
EPO Communication, issued in corresponding EPO Application No. 07709430.8; PCT/SE2007/050037, dated Feb. 13, 2013; Supplementary European Search Report (6 pgs).
EPO Communication pursuant to Article 94(3) EPC, issued in corresponding EPO Application No. 07 709 430.8, dated May 23, 2014 (3 pgs).

METHOD AND ARRANGEMENT IN A TELECOMMUNICATION SYSTEM

RELATED APPLICATIONS

This application is a continuation application of U.S. patent application Ser. No. 12/162,522, filed Jan. 7, 2009, now U.S. Pat. No. 8,391,131, which claims priority and benefit from International Application No. PCT/SE2007/050037, filed Jan. 24, 2007, which claims priority to Swedish application no. 0600255-4, filed Feb. 3, 2006, the entire teachings of which are incorporated herein by reference.

FIELD OF THE INVENTION

The present invention relates to methods and arrangements in cellular mobile communication systems, in particular to a random access burst construction for a 3G LTE (Long Term Evolution) communication system.

BACKGROUND OF THE INVENTION

In modern cellular radio systems, the radio network has a strict control on the behavior of the terminal. Uplink transmission parameters like frequency, timing, and power are regulated via downlink control signaling from the base station to the terminal.

In order for the base station (also called Node B in WCDMA terminology) to control the terminal (also called user equipment, abbreviated to UE in WCDMA terminology), measurements on an uplink signal are required. The determination of timing misalignment requires a comparison of the timing of the received signal with a reference clock in Node B. Timing misalignment is caused by unknown propagation delay and the mutual drift between the clocks in the Node B and in the UE. Likewise, the determination of the transmit power requires a measurement of the received power in Node B in comparison with some threshold. The received power not only depends on the UE transmit power but also on the signal attenuation during propagation. The latter will differ over time.

Uplink measurements are rather straightforward when the UE has established a duplex connection with the Node B. In that case, uplink signals are present for the measurements, whereas downlink signals can carry the control signaling to adjust the UE parameters. However, when the UE is not connected but is in standby, it only listens to the downlink control signal periodically. Thus, there is no uplink signal for the Node B to measure. Before connection establishment, the UE has to carry out a random access (RA) procedure. This is initiated by the UE transmitting a random access burst through a radio interface to the network, which is received by Node B. During the random access procedure, uplink parameters like timing and power are not very accurate. This poses extra challenges to the dimensioning of a random access procedure.

Usually, a physical random access channel (PRACH) is provided for the UE to request access to the network. This means that random access bursts must be detected with good confidence and, when detected, used for propagation delay estimation. The used access burst (AB) contains a preamble with a specific bit sequence that has good auto-correlation properties. The PRACH can be orthogonal to the traffic channels (TCH). For example, in GSM a special PRACH slot is defined. Because multiple UEs can request access at the same time, collisions may occur between requesting UEs. A contention resolution scheme has to be implemented to separate the UE transmissions. This scheme usually includes a random back off procedure. The timing uncertainty is accounted for by extra guard time. The power uncertainty is usually less of a problem as the PRACH is orthogonal to the traffic channels.

In WCDMA, the PRACH is shared with the uplink traffic channels. The uplink channels are not orthogonal. In addition to interference from other requesting UEs, interference is experienced from uplink traffic channels and vice versa. The processing gain provided by the Direct-Sequence spreading will have to cope with the mutual interference. In WCDMA, the transmit power is a shared radio resource. In order to avoid near-far problems, the power received at Node B has to be approximately equal for each UE.

Traffic channels in LTE, i.e. an uplink (UL) basic transmission scheme, are described, e.g., in the document 3GPP TR25.814, v7.1.0 (2006-09), "Physical Layer Aspects for Evolved UTRA", Technical Report, Technical Specification Group Access Network, 3rd Generation Partnership Project (Rel.7). Here, a cyclic prefix (CP) is inserted in order to enable frequency domain processing. A cyclic prefix (CP) is a sequence of symbols inserted at the start of a block that correspond to a number of symbols at the end of that block. In other words, the cyclic prefix is a repeat of the end of the sequence inserted at the beginning. This means that support for calculating, e.g., Fast Fourier Transforms (FFTs) is needed in an uplink (UL) receiver side of a communication system.

Whenever a discrete Fourier transform (DFT) implemented as an FFT is used on a time domain signal, this time domain signal is assumed to be periodic with period time equal to the length of the DFT. In order to ensure this for signals subject to dispersive channels, a cyclic prefix can be used.

SUMMARY OF THE INVENTION

In accordance with a first aspect of the invention there is provided a method of operating a communication system as defined in claim 1.

The peak-to-sidelobe ratio of the autocorrelation of a preamble is determined by the Time-Bandwidth (TB) product. Large Time-Bandwidth products are desired. In conventional systems, however, the Access Burst (AB) is fed into a time-sliding correlator which is matched to the preamble sequence. If the Time-Bandwidth product is large and, in addition, different preamble sequences can be used, the correlation becomes a computationally complex operation. In WCDMA, the current correlators are regarded as highly complex circuits. These correlators are specially designed, and operate in parallel to the traffic streams. With LTE, the Time-Bandwidth products may increase, further challenging the circuit design.

In order to overcome the problems with highly complex circuits of the current random access burst detection, the solution according to the present invention suggests using frequency-domain processing instead of time-domain processing. Correlation in the time domain with the sequence impulse response corresponds to multiplication in the frequency domain with the sequence frequency response. Such a frequency domain multiplication is equivalent to a time domain correlation if a cyclic prefix is used which has a length of at least the maximum delay spread of the dispersive channel plus maximum round-trip propagation delay.

In the preamble detection, the round-trip propagation delay is unknown and to be estimated. In order to ensure that the received signal appears periodic within the observation window, a cyclic prefix might be used with a length that is at least equal to the maximum round-trip delay plus the maximum delay spread of the dispersive channel. Also, a guard time should have a length at least equal to maximum round-trip propagation delay in order to avoid RA transmissions from interfering with subsequent transmissions.

One advantage with this invention is that the receiver for the random access procedure can use the FFT and inverse FFT (IFFT) circuitry also in use for the traffic uplink channels. Therefore, no separate access burst receiver chain needs to be constructed in parallel to the traffic receiver chain.

Another advantage of this invention is that the reception can be done in the frequency domain, which will result in a less computationally complex receiver in comparison to a time domain receiver that is conventionally used for random access. Furthermore, frequency domain processing enables utilization of periodic correlation functions which show better properties than a-periodic correlation functions, thus improving detection performance.

Several PRACHs may have been defined at different parts in the overall frequency band allocated to the system. Several random access attempts may take place simultaneously at these different PRACHs. After performing an FFT on the received signal, the frequency band allocated to each PRACH can be easily extracted.

By including a cyclic prefix before the preamble, the number of FFT computations within the random access window reduces considerably. A smaller cyclic prefix before the message part will allow frequency domain equalization in a multipath environment. Unique words can be included to train the receiver and facilitate decision feedback equaliser (DFE), maximum likelihood sequence estimation (MLSE) and decision feedback sequence estimation (DFSE) operations. The unique words can be made part of the preamble sequence thus reducing the overhead they may provide. By using zero padding instead of a cyclic prefix for the preamble the spectrum efficiency can be improved.

BRIEF DESCRIPTION OF THE DRAWINGS

The invention will now be described, by way of example, with reference to, and as shown in, the following drawings, in which:

FIGS. 11($a$) and 11($b$) show a transmitted signal without cyclic prefix and the corresponding received signal. FIG. 11($c$) illustrates the transmission of a cyclic prefix resulting in the received signal depicted in FIG. 11($d$). Superposition of the signals in FIGS. 11($b$) and 11($d$) delivers the now cyclic signal in FIG. 11($e$). The same result (within the N sample wide frame) can be achieved by the overlap-and-add operation as shown in FIG. 11($f$)

DESCRIPTION OF THE INVENTION

Figure 1:
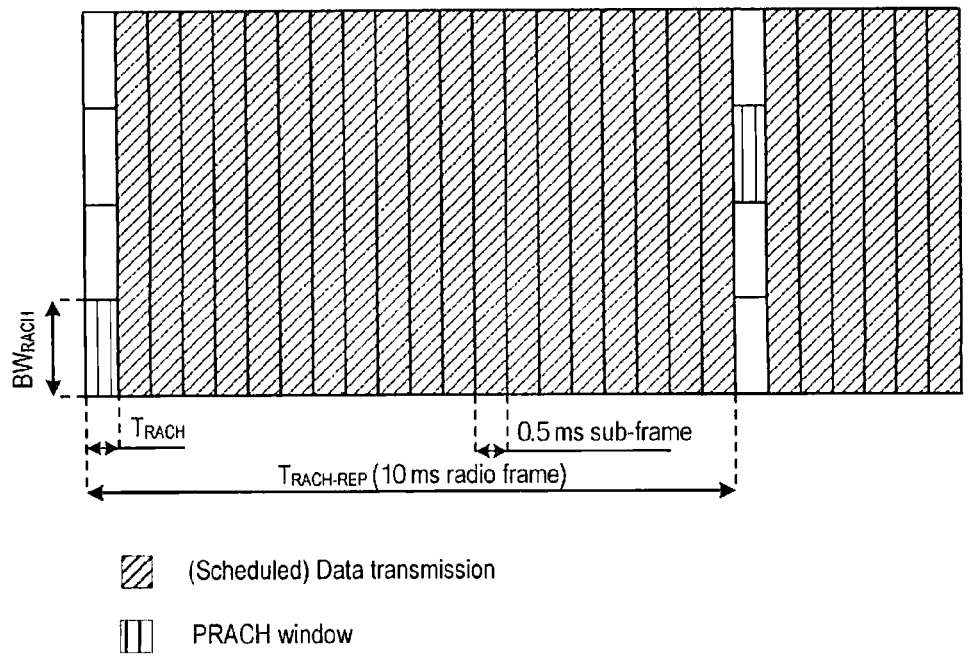
FIG. 1 illustrates a schematic view of the proposed time-frequency mapping of the PRACH in an LTE communication system with one RA window each 10 ms.

The description of the present invention applies as a working assumption a random access (RA) window of 0.5 ms repeated every 10 ms as illustrated in FIG. 1. Naturally, the present invention is not restricted to such values and is equally applicable for other parameter values. The description uses the terminology of a WCDMA-based communication system. However, it is notwithstanding possible to apply the invention accordingly in other systems.

Figure 2:
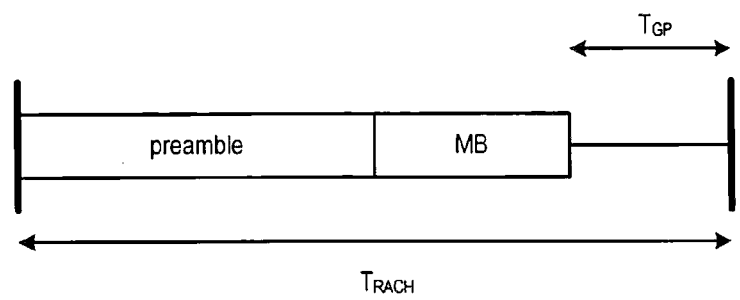
FIG. 2 illustrates an access burst format.

During the access window of length $T_{RACH}$, which is normally 0.5 ms but can be extended for large cells, the user equipment (UE) may send an access burst (AB) to a Node B. Because the UE is not yet time synchronized in the uplink, there is an unknown propagation delay. A guard period (GP) of length $T_{GP}$ is required at the end of the access burst to prevent the access burst from overlapping with traffic bursts that follow after the RA window. The basic access burst format within the random access (RA) window is shown in FIG. 2, where the AB has a preamble and a message block (MB).

As an example, when assuming a guard period (GP) of 100 µs after an AB burst of 400 µs, the AB can be received at the Node B with a maximum delay of 100 µs. This 100 µs delay corresponds to a design where a maximum cell radius of $$\frac{100 \cdot 10^{-6} \cdot 3 \cdot 10^8}{2} \approx 15 \text{ km can be handled (when } T_{RACH} \text{ equals 0.5 ms).}$$

If the total AB length is shorter than 400 µs, no overlap will occur with later traffic bursts, even under the biggest delay conditions in that 15 km radius cell.

Several different preambles can be defined to separate multiple users simultaneously performing a random access. Preferably, a set including a small number of preambles is defined from which a UE performing a random access can select a sequence at random. Rules linking the preambles to a pre-assigned UE ID can also be considered. The message block (MB), which is optional, can be used to carry, e.g., information required to set up a connection.

Figure 3:
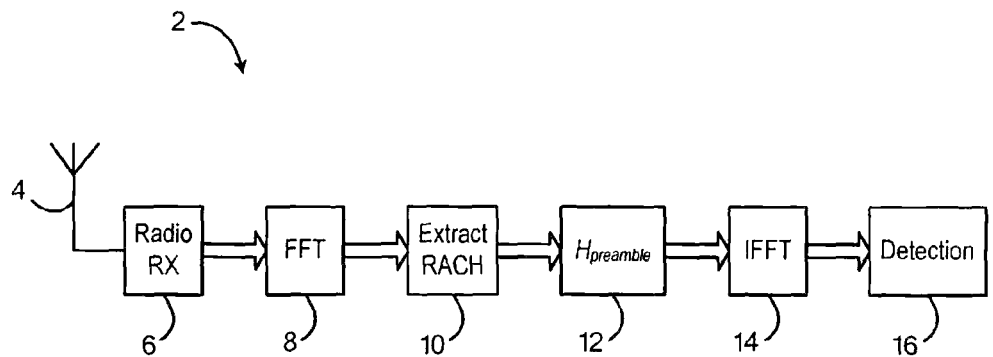
FIG. 3 illustrates a receiver structure for preamble detection using frequency domain techniques.

For each RA window of length $T_{RACH}$, as illustrated in FIG. 1, the Node B receiver will start with a preamble detector. Instead of using a matched correlator in the time domain, the detection is carried out in the frequency domain in accordance with the invention. This can be accomplished by applying an FFT, and extracting the frequency band corresponding to the RACH resulting in RACH sub-carriers. These extracted sub-carriers are multiplied with the conjugate complex of the preamble frequency response $H_{preamble}(f)$, followed by an inverse FFT. The output of the IFFT will show the autocorrelation function, and a proper detection of the preamble can then be carried out. FIG. 3 shows a Node B receiver 2 for carrying out this detection. The receiver 2 comprises an antenna 4 coupled to radio receiver circuitry 6. The received signal is then passed through FFT circuitry 8, circuitry 10 for extracting the RACH frequency band, multiplication block 12 and IFFT block 14 in turn. Finally, a detection block 16 is provided for detecting the preamble.

The location of the preamble within the RA window at the Node B is unknown and depends on the distance between the UE and the Node B. A first cyclic prefix (CP1) is added at the start of the preamble. The length of this first cyclic prefix (CP1) preferably corresponds to the maximum round-trip time plus maximum delay spread.

Figure 4:
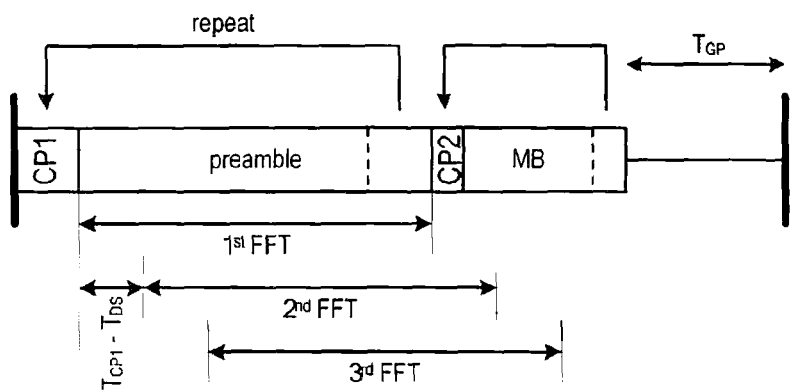
FIG. 4 illustrates an access burst FFT processing.

However, if a cyclic prefix is used which is shorter than the maximum round-trip time plus maximum delay spread, then FFT sampling windows might be staggered with a short overlap. The offset between the successive sampling windows is preferably equal to the difference between the length of the first cyclic prefix $T_{CP1}$ and the length of the delay spread $T_{DS}$, as shown in FIG. 4. The number of FFT sampling windows now reduces to $T_{GP}/(T_{CP1}-T_{DS})$.

As described above, a cyclic prefix is a set of symbols inserted at the start of a block that correspond to a number of symbols of the end of that block.

A message block (MB) might be included in the AB, e.g. after the preamble. This MB might preferably, but not necessarily, include a UE ID as described above. When multiple UEs are requesting access simultaneously, the Node B must have a way to distinguish between them. The MB may also include additional information, for example the reason for access, scheduling request information, and so on. The MB is decoded after detection of the preamble, since the preamble detection can deliver radio channel estimates, timing estimates and frequency offset estimates. A second cyclic prefix CP2 can be added before the MB in order to facilitate the equalization in the frequency domain. The second cyclic prefix CP2 allows frequency domain equalization which can undo the effects of multi-path fading. Since the MB will be decoded after timing synchronization has been established using the preamble, the length of the second cyclic prefix CP2 only has to take into account the multi-path (delay spread) and not the initial time uncertainty. Therefore the length of the second cyclic prefix CP2 for the MB should be shorter than the first cyclic prefix CP1 for the preamble. Preferably CP2<<CP1.

If a frequency domain equalizer is used at the receiver side (e.g. in Node B), an FFT should be calculated over the MB as well. This implies that the length of the MB should preferably be $2^k$ times the sampling period, where k is an integer.

Figure 5:
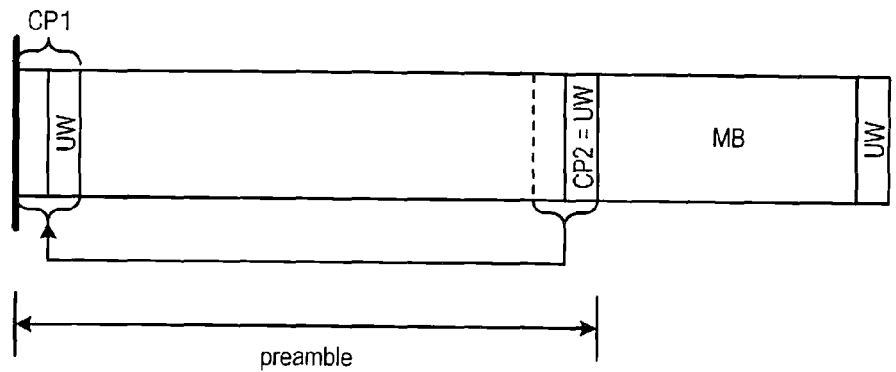
FIG. 5 illustrates an access burst including a unique word.

In an embodiment of the invention, it is possible to use a selection of unique words (UW) with the cyclic prefixes (CP). The symbol detection of the message block (MB) can be improved by the MB including known training sequences, called unique words (UW). A unique word (UW) can form the second cyclic prefix CP2 of FIG. 4, as shown in FIG. 5. Here, the result is that the UW is placed both before and after the MB. In this way, the UW can serve both as a cyclic prefix and a tail sequence in a DFE (Decision Feedback Equalizer), MLSE (maximum likelihood sequence estimator) or any hybrid, e.g. DFSE (Decision Feedback Sequence Estimator). Since the UW is a fixed sequence, it can also be made part of the trail of the preamble. The trail of the preamble is the last few samples of the preamble sequence. Alternatively, the UW might be selected as the last part of the preamble. Therefore, it will also be repeated as a part of the first cyclic prefix CP1 as illustrated in FIG. 5. In that case, the UW does not have to be inserted explicitly as a second cyclic prefix in the message block as in FIG. 4, thus reducing overhead.

If a frequency domain equalizer is used at the receiver side (e.g. in Node B), an FFT should be calculated over both the MB and the UW. This implies that the length of the MB and UW should preferably be $2^k$ times the sampling period where k is an integer.

Yet another embodiment of the present invention may relate to the use of zero padding (ZP) instead of, or in addition to cyclic prefixes (CP). The zero padding (ZP) is used in order to improve spectrum efficiency. After the preamble, a number of zero valued symbols can be added, where the length of the symbol corresponds to the sum of the maximum round-trip time and the maximum delay spread (i.e. the same as the length of the first cyclic prefix CP1 above). These zero valued symbols can also serve as a guard period at the end of the access burst in order to avoid overlap of the preamble with the subsequent sub-frame. Since this ZP replaces both the CP (of, e.g., approximately 100 μs for round trip time and 5 μs for delay spread) and the GP (also of, e.g., approximately 100 μs), the spectrum efficiency is improved. This increase in spectrum efficiency might be used for a longer preamble, a longer MB, or a longer guard period which would allow the possibility of using larger cells). A short guard period should also be placed before the preamble, in order to avoid overlap with symbols transmitted before the preamble.

Figure 6:
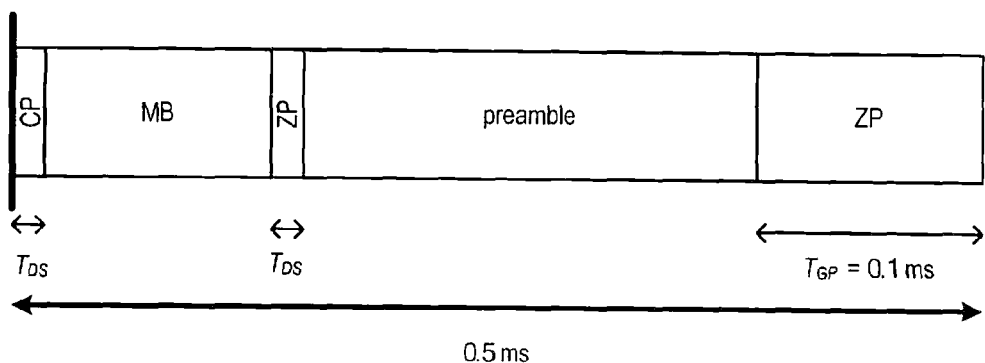
FIG. 6 illustrates an access burst using zero padding for the preamble and a message block (MB) with cyclic prefix (CP) with the message block placed before the preamble.
Figure 7:
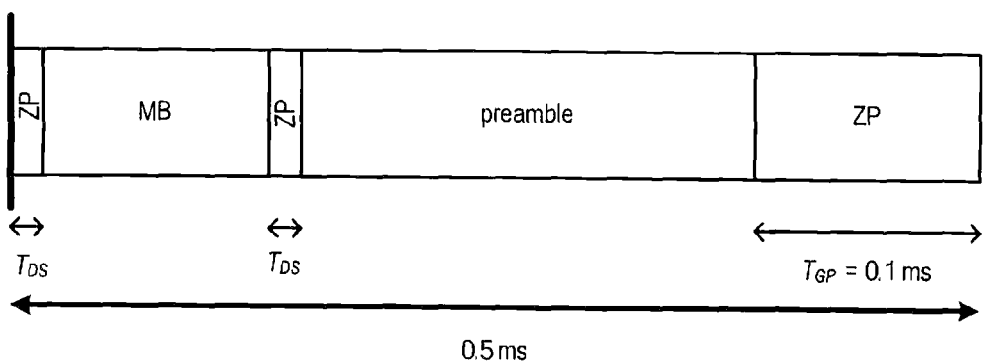
FIG. 7 illustrates an access burst using zero padding for the preamble and a message block, whereby the message block is placed before the preamble.
Figure 8:
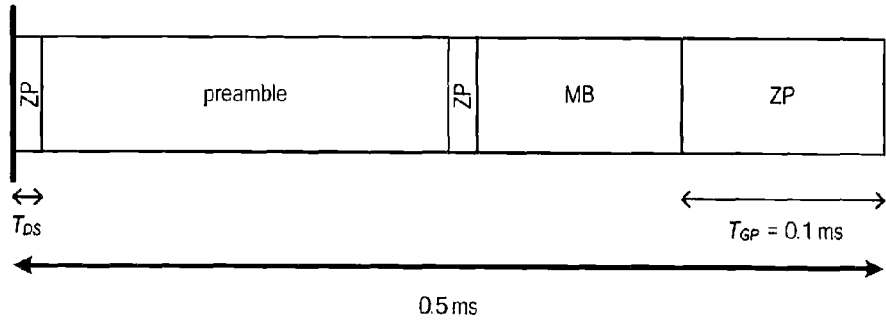
FIG. 8 illustrates an access burst using zero padding for the preamble and a message block, whereby the message block is placed after the preamble.

Preferably, in this embodiment, the MB is placed before the preamble. FIG. 6 shows an access burst with the message block placed before the preamble, a cyclic prefix preceding the message block, and zero padding preceding the preamble. FIG. 7 shows another access burst with the message block placed before the preamble, where both the message block and preamble are preceded by zero padding. Alternatively, the MB can be placed after the preamble, as shown in FIG. 8 with both the preamble and message block being preceded by zero padding, but then the benefit of reusing the ZP as the guard period is lost.

In the embodiments where the preamble is preceded by a cyclic prefix, the application of frequency domain processing is straight forward. In addition to the advantage of lower implementation complexity (compared to traditional time-domain matched filter processing), frequency domain processing also offers the advantage of using periodic correlation functions. Many sequences have ideal periodic autocorrelation functions (e.g. Generalized Chirp-Like or Zadoff-Chu sequences) but non-ideal a-periodic auto-correlation functions.

Application of a discrete Fourier transform (DFT) to a received signal $y_n$ delivers $$Y_k = H_k P_k(u),$$

where $H_k$ and $P_k(u)$ are the DFT of the channel impulse response $h_n$ and preamble sequence $p_n(u)$ evaluated at index k, respectively. The transformation length N is equal to the preamble length and $Y_k$ is the received signal $y_n$ after DFT application. Index u specifies which preamble was chosen by the UE. This sequence index is chosen by the UE and is unknown to the Node B receiver.

In order to determine the relative timing between Node B and UE the receiver determines which sequence u was transmitted by the UE and subsequently determines the timing. One way to determine the sequence index is to multiply $Y_k$ with all possible DFT transformed preamble sequences $P_k^*(v)$ and to transform the obtained vectors back into the time-domain by means of inverse DFT (IDFT) transformations of length N. Such an arrangement is shown in FIG. 9.

Thus, the received signal $y_n = h_n p_n(u)$ is transformed by a DFT of length N into the frequency domain. A branch is then provided for each possible preamble sequence $p_n(u)$ and the DFT of the signal, $Y_k$, is multiplied by the conjugate complex DFT of each preamble sequence $p_n(u)$, denoted $P_k^*(v1)$, $P_k^*$ (v2), ..., $P_k^*(vx)$. The inverse DFT of each product is taken and, for each branch, a detector should be used where, e.g., the output from the IDFT is compared to a threshold in order to decide if that corresponding sequence was received. In this manner, several sequences might be detected; one for each branch. A maximum device can be used to select those branches (i.e. sequence index u) having the highest peak magnitude, if there is a limitation on the number of detected signatures.

Figure 9:
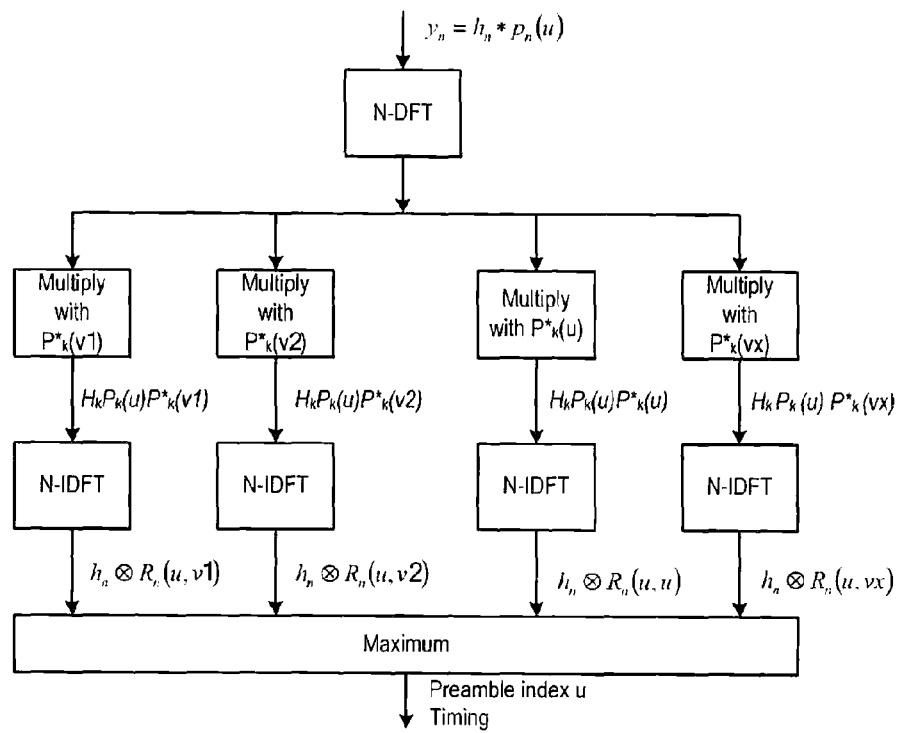
FIG. 9 illustrates an arrangement to find sequence ID and timing in the frequency domain.

It should be noted that the size of the DFT might be larger than the size of the IDFT, see FIG. 9. This is because the DFT might be used on a received signal with a much higher bandwidth than the RACH channel, and that an extraction of the RACH bandwidth is done after the DFT (compare this with FIG. 3).

Multiplication in the DFT domain corresponds to cyclic convolution in the time-domain when the DFT transformation length is chosen appropriately. The frequency vectors $$Z_k(v) = Y_k P_k^*(v)$$
$$= H_k P_k(u) P_k^*(v)$$

correspond in the time-domain to a cyclic convolution $$z_n(v) = h_n \otimes p_n(u) \otimes p_{-n}^*(v).$$

The cyclic convolution between the two last terms gives, in the case that u is equal to v, the periodic auto-correlation function, and otherwise the periodic cross-correlation function. As already mentioned the periodic auto-correlation function has better properties than the a-periodic one and thus detection performance is improved.

After the correct sequence has been identified (u=v) the peak location of $z_n(u)$ is a first estimate for the relative timing between Node B and UE. This first estimate can be improved by subsequent signal processing operations taking, e.g., the multi-path character of the channel into account.

As mentioned earlier, the preamble sequence identification does not have to be performed with the above described IFFT transformations and subsequent maximum operation, other means can be envisioned, too. Nevertheless, as long as the auto-correlation is calculated in the frequency-domain as described above, advantages concerning the periodic auto-correlation remain.

Figure 10:
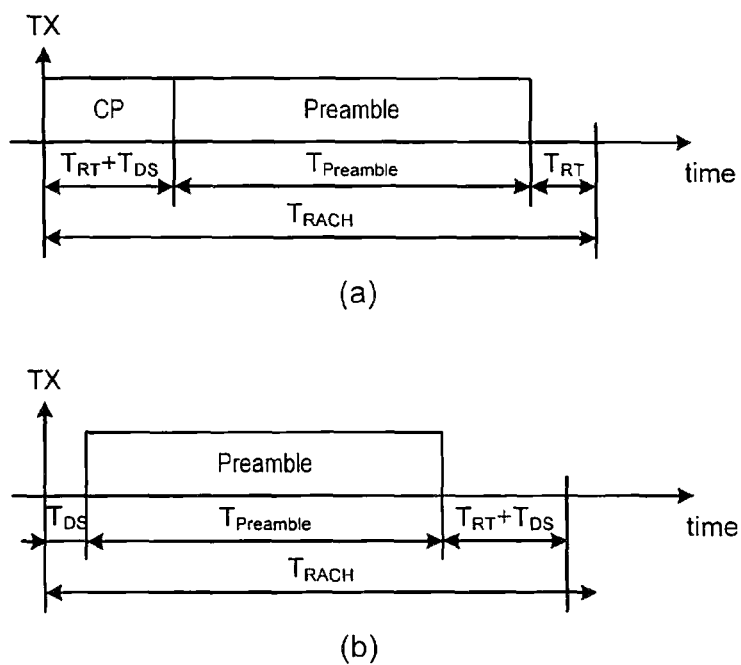
FIGS. 10($a$)-($b$) show the improved spectral efficiency when zero padding is used.

As described above, the replacing of the cyclic prefix by zero padding, and combining it with the guard period in order to avoid interference with the next sub-frame, increases the spectral efficiency. This is illustrated in FIG. 10 by a RACH time slot of length $T_{RACH}$ in which there is a cyclic prefix CP before the preamble (FIG. 10(*a*)) and zero padding before and after the preamble (FIG. 10(*b*)).

Assuming a constant preamble length $T_{preamble}$, the shorter length of the zero padding ($T_{DS}$) compared to the length of the cyclic prefix (roundtrip time ($T_{RT}$)+$T_{DS}$) means that the RACH slot can be shorter.

Alternatively, if the length of the RACH time slot is fixed, the length of the preamble in the zero padding embodiment can be increased.

The frequency domain processing as described above is preferably applicable to signals with a cyclic prefix. Nevertheless, this scheme can also be applied to cases without cyclic prefixes. The following considers a RACH burst consisting only of the preamble and no message block. However, the following is also applicable to a RACH burst consisting of a preamble and a message block.

Figure 11:
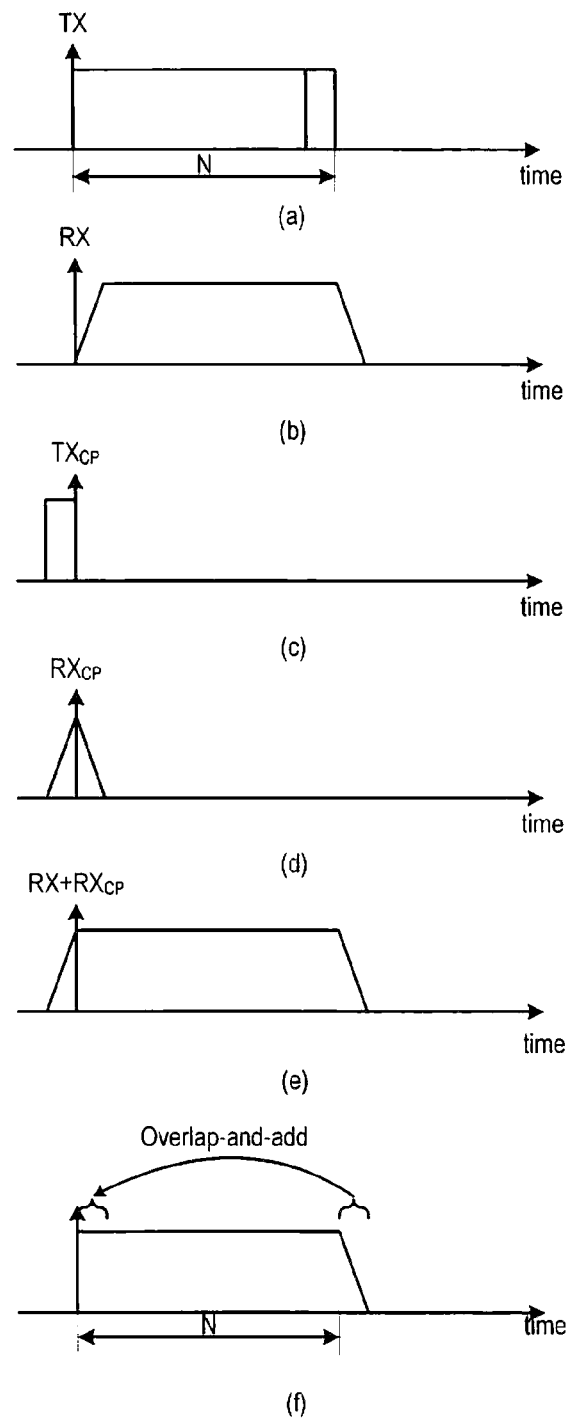
FIGS. 11($a$)-11($f$) illustrate the derivation of efficient frequency domain reception for zero-padded signals.

FIG. 11(*a*) shows the transmitted signal without a cyclic prefix. The signal received in this case is shown in FIG. 11(*b*). Mathematically this signal is the linear convolution between the channel and the transmitted sequence. Preceding the transmit signal by a cyclic prefix of sufficient length would convert the received signal—within the indicated receiver window—into a cyclic convolution. The cyclic prefix and its corresponding received signal are shown in FIG. 11(*c*) and FIG. 11(*d*), respectively. FIG. 11(*e*) shows the signal received when there is a cyclic prefix before the transmit signal.

Since the cyclic prefix is a copy of the last part of the transmitted signal depicted in FIG. 11(*a*), the received signal due to the cyclic prefix (from time index 0 on in FIG. 11(*d*)) is equal to the received signal shown in FIG. 11(*b*) (from time index N on). Thus, the same effect a cyclic prefix would have can now be achieved by the overlap-and-add operation depicted in FIG. 11(*f*). In other words, the received signal from time index N onwards in FIG. 11(*b*) (which is the same as that contributed by the cyclic prefix from time index 0 onwards in FIG. 11(*d*)), is copied and added to the start of the received signal. The signal obtained after this overlap-and-add operation is identical to the signal received due to a transmit signal with cyclic prefix, as depicted in FIG. 11(*e*). Due to this equivalency, all signal processing steps described for the cyclic prefix embodiment and frequency domain processing are now also valid here.

It is noted that application of a DFT of sufficient length, i.e. the transformation length must be equal or greater than the preamble length N plus the length of the delay spread of the channel, to the signal depicted in FIG. 11(*b*) and subsequent down-sampling in the frequency-domain to obtain a frequency representation of length N is equivalent to a DFT transformation of length N applied to the signal shown in FIG. 11(*f*). For example, application of a DFT with length 2N to the signal depicted in FIG. 11(*b*) and subsequent down-sampling by a factor of 2 yields the same result as applying a length N DFT to the signal in FIG. 11(*f*).

Figure 12:
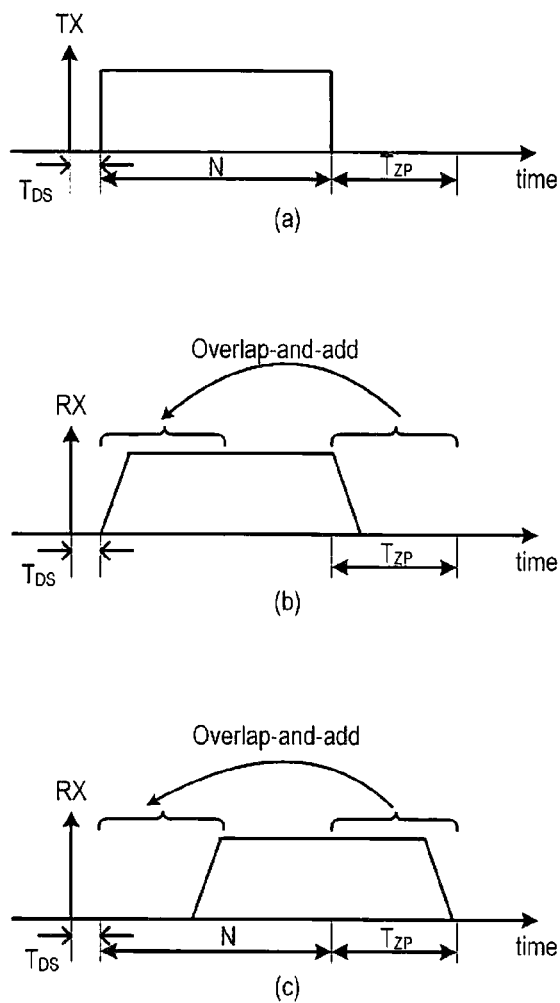
FIGS. 12($a$)-12($c$) illustrate an N sample long receiver frame as well as the overlap-and-add operation for such a channel.

The illustrations in FIG. 11 do not show how the receiver window must be placed in the case of channels having a delay. Since the receiver (i.e. Node B) does not know about the particular propagation delay (roundtrip time) from a UE, the N sample long frame cannot depend on this delay. FIG. 12 shows this N sample long receiver frame as well as the overlap-and-add operation for such a channel described above. Note that this illustration does not include a message block, however, this scheme can be extended to an arrangement with a message block.

Here, the preamble is preceded by a small guard period $T_{DS}$ protecting the preamble from inter-block interference created by previously transmitted signals. This guard period must match the expected delay spread of the channel and is of the order of several micro seconds. After the preamble the zero padding of length $T_{ZP}$ is inserted. This guard period must match the maximal expected round trip time plus maximum delay spread and is in the order of 100 μs for a cell with 15 km radius.

The N sample long receiver window starts after the small guard period $T_{DS}$. The overlap-and-add operation superposes the indicated signal portion to the signal at the beginning of the N sample long frame.

Thus, in FIG. 12(*b*), the UE is quite close to the Node B as the signal arrives almost immediately. Therefore, the indicated portion outside the N sample window is overlapped-and-added to the start of the received signal.

FIG. 12(*c*) represents the received signal when the UE is the maximum permitted distance from Node B (i.e. the end of the signal is received at the end of the guard period $T_{ZP}$). In this case, a larger portion of the signal is overlapped-and-added to the start of the received signal.

There is therefore provided a random access burst construction for a LTE communication system that overcomes disadvantages of prior art systems.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating a device in a communication system, the method comprising:
    generating a random access transmission including a preamble followed by a message block followed by a guard period, wherein:
        the preamble includes a first cyclic prefix;
        the message block includes a second cyclic prefix that is shorter than the first cyclic prefix, the second cyclic prefix having a length that is at least equal to a maximum delay spread of a channel between the device and a receiver in the communication system; and
        a length of the guard period is at least a maximum round-trip time for signals between the device and the receiver; and
    transmitting the random access transmission to the receiver in the communication system.

2. The method as claimed in claim 1, wherein the step of generating comprises generating a random access transmission in which the message block ends with a known training sequence.

3. The method as claimed in claim 1, wherein the step of generating comprises generating a random access transmission in which a trail of the preamble comprises a known training sequence.

4. The method as claimed in claim 3, wherein the step of generating comprises generating a random access transmission in which at least a portion of the first cyclic prefix comprises a repeat of the known training sequence.

5. The method as claimed in claim 3, wherein the step of generating comprises generating a random access transmission in which the message block ends with the known training sequence.

6. The method as claimed in claim 1, wherein the length of the second cyclic prefix is such that the second cyclic prefix preceding the message block corresponds to the known training sequence.

7. A device for use in a communication system, the device comprising:
    a transmitter configured to generate and transmit a random access transmission to a receiver in order to access the communication system, the random access transmission comprising a preamble followed by a message block followed by a guard period, wherein:
        the preamble includes a first cyclic prefix;
        the message block includes a second cyclic prefix that is shorter than the first cyclic prefix, the second cyclic prefix having a length that is at least equal to a maximum delay spread of a channel between the device and the receiver; and
        a length of the guard period is at least a maximum round-trip time for signals between the device and the receiver.

8. The device as claimed in claim 7, wherein the step of generating comprises generating a random access transmission in which the message block ends with a known training sequence.

9. The device as claimed in claim 7, wherein the step of generating comprises generating a random access transmission in which a trail of the preamble comprises a known training sequence.

10. The device as claimed in claim 9, wherein the step of generating comprises generating a random access transmission in which at least a portion of the first cyclic prefix comprises a repeat of the known training sequence.

11. The device as claimed in claim 9, wherein the step of generating comprises generating a random access transmission in which the message block ends with the known training sequence.

12. The device as claimed in claim 7, wherein the length of the second cyclic prefix is such that the second cyclic prefix preceding the message block corresponds to the known training sequence.

13. A method of operating a receiver in a communication system, the method comprising:
    receiving from a user equipment a random access transmission including a preamble followed by a message block followed by a guard period, wherein:
        the preamble includes a first cyclic prefix;
        the message block includes a second cyclic prefix that is shorter than the first cyclic prefix, the second cyclic prefix having a length that is at least equal to a maximum delay spread of a channel between the user equipment and the receiver; and
        a length of the guard period is at least a maximum round-trip time for signals between the user equipment and the receiver;
    processing the random access transmission in the frequency domain by the steps of:
    applying a Fourier transform to a portion of the received random access transmission;
    calculating a conjugate complex Fourier transform of each of a plurality of preambles in a set of possible preambles, and multiplying each of the calculated Fourier transformed preambles by the result of the applying step;
    calculating an inverse Fourier transform of each result from the multiplying step;
    comparing the results of the calculating an inverse Fourier transform step with a threshold to determine which of the preambles was used in the random access transmission; and
    decoding the message block after timing synchronisation has been established using the preamble.

14. The method as claimed in claim 13, further comprising the step of determining a received power level at the receiver from the detected preamble.

15. A receiver in a communication system comprising:
a processor; and a memory coupled to the processor;
wherein the processor is configured to process in the frequency domain a random access transmission received from a user equipment, the random access transmission including a preamble followed by a message block followed by a guard period, wherein:
the preamble includes a first cyclic prefix;
the message block includes a second cyclic prefix that is shorter than the first cyclic prefix, the second cyclic prefix having a length that is at least equal to a maximum delay spread of a channel between the user equipment and the receiver; and
a length of the guard period is at least a maximum round-trip time for signals between the user equipment and the receiver;
said processor being configured to:
apply a Fourier transform to a portion of the received random access transmission;
calculate a conjugate complex Fourier transform of each of a plurality of preambles in a set of possible preambles, and multiplying each of the calculated Fourier transformed preambles by the result of the applying step;
calculate an inverse Fourier transform of each result from the multiplying step;
compare the results of the calculating an inverse Fourier transform step with a threshold to determine which of the preambles was used in the random access transmission; and
decode the message block after timing synchronisation has been established using the preamble.

16. The receiver as claimed in claim 15, the process being configured to determine a received power level at the receiver from the preamble.

* * * * *